(12) United States Patent
Juillet

(10) Patent No.: US 9,651,173 B2
(45) Date of Patent: May 16, 2017

(54) LIFTING SUPPORT SYSTEM

(71) Applicant: Christopher Juillet, Hoboken, NJ (US)

(72) Inventor: Christopher Juillet, Hoboken, NJ (US)

(73) Assignee: Richards Manufacturing Company Sales, Inc., Irvington, NJ (US)

( * ) Notice: Subject to any disclaimer, the term of this patent is extended or adjusted under 35 U.S.C. 154(b) by 0 days.

(21) Appl. No.: 14/702,133

(22) Filed: May 1, 2015

(65) Prior Publication Data

US 2015/0323102 A1  Nov. 12, 2015

Related U.S. Application Data

(60) Provisional application No. 61/989,438, filed on May 6, 2014.

(51) Int. Cl.
| | |
|---|---|
| *F16L 3/11* | (2006.01) |
| *F16L 3/20* | (2006.01) |
| *F16L 3/23* | (2006.01) |
| *H02G 1/06* | (2006.01) |
| *B66C 1/16* | (2006.01) |
| *B66C 1/18* | (2006.01) |
| *H02G 3/30* | (2006.01) |
| *H02G 9/06* | (2006.01) |

(52) U.S. Cl.
CPC ....... *F16L 3/11* (2013.01); *B66C 1/16* (2013.01); *B66C 1/18* (2013.01); *F16L 3/20* (2013.01); *F16L 3/23* (2013.01); *H02G 1/06* (2013.01); *H02G 3/30* (2013.01); *H02G 9/06* (2013.01)

(58) Field of Classification Search
CPC ....... F16L 3/11; F16L 3/20; F16L 3/23; A61G 1/04; A61G 1/044; A61B 6/0442
See application file for complete search history.

(56) References Cited

U.S. PATENT DOCUMENTS

| | | | | |
|---|---|---|---|---|
| D406,254 S | * | 3/1999 | Simpson | D12/133 |
| D464,433 S | * | 10/2002 | Kiefer | D24/190 |
| 8,464,379 B1 | * | 6/2013 | Zajac | A61G 1/04 |
| | | | | 5/113 |

* cited by examiner

*Primary Examiner* — Rodney Mintz
*Assistant Examiner* — Daniel Kenny
(74) *Attorney, Agent, or Firm* — Bakos & Kritzer

(57) ABSTRACT

A lifting support apparatus and system is disclosed with integrated mounting points for lifting straps. The lifting support apparatus comprises a joint shield and arc proof cover. A cable accessory is placed on the joint shield and surrounded on its sides and top by the arc proof cover. The exposed ends of the arc proof cover allow for the visible inspection of the connectors of the cable accessory. By incorporating mounting points on the joint shield, the lifting straps are prevented from sliding along the arc proof cover or becoming dislodged. Further, the joint shield includes at least one rib on its bottom surface to prevent the joint shield from bending.

3 Claims, 5 Drawing Sheets

LIFTING SUPPORT SYSTEM

CROSS-REFERENCE TO RELATED APPLICATION

The present invention claims priority to U.S. Provisional Application Ser. No. 61/989,438, filed on May 6, 2014, and entitled "Lifting Support System," which is hereby incorporated by reference herein in its entirety.

TECHNICAL SUPPORT

The present invention relates generally to cable support apparatuses and systems in the field of high voltage power connectors utilized in power distribution systems. Specifically, the present invention relates to a lifting support apparatus for transporting high voltage power connectors.

BACKGROUND OF THE INVENTION

Electrical distribution networks are critical for the delivery of electricity to consumers and businesses from the transmission system. Such a network can include power lines, substations, transformers, and meters that are interconnected by thousands of miles of underground cables. Underground cable accessories, such as cable splices and disconnectable joints, are racked in underground structures to support and separate cable runs from each other. Typically, the cable accessories are installed on rack arms extending from the walls of the underground structure. These rack arms have various mounting positions which allows a splicer to make adjustments as new cable runs or other equipment are installed in the underground structure. Once a set of cable accessories are energized it can be time consuming and costly to de-energize the circuit for the purposes of re-positioning, because the process can interrupt electricity to residential and commercial areas until the procedure is complete.

Due to the critical need for the continual operation of electrical distribution networks, such problems have not been entirely ignored in the industry. Generally, a cable accessory rests on a fiberglass joint shield that is used to transport the energized or de-energized cable accessory. Cables are attached to the connectors of the cable accessory. Because of the restricted space in which cable accessories are normally installed, it can be difficult to use external equipment to lift, move, and/or reposition the fiberglass joint shield and cable accessory. Therefore, the process of moving the fiberglass joint shield and cable accessory is performed by wrapping nylon straps underneath the fiberglass joint shield. Thereafter, the nylon straps, fiberglass joint shield, and cable accessory are lifted using a crane or winch. However, there is a risk of the fiberglass joint shield sliding out of the lifting straps, because the nylon straps are not securely engaged to the fiberglass joint shield. This causes a serious safety concern, because the cables connected to the cable accessory can become partially disassembled due to an unsupported cable accessory and cause an electrical failure.

Yet another problem with the fiberglass joint shield used in the art is that it does not provide support for the cables attached to the connectors of the cable accessory. Shielded power cables are sensitive to bending. Therefore, extreme care must be taken in ensuring that the power cable is not bent around a small radius or sharp point, because it can lead to electrical failure of the power cable. The current fiberglass joint shield used in the art fails to address these concerns because it permits a portion of some power cables connected to the cable accessory to hang over a sharp edge. Therefore, the portion of the hanging cable can bend and result in electrical failure.

Another problem with the fiberglass joint shield used in the art is that it can easily bend, because it is composed of flexible material. This bending allows the lifting straps to slide out of position. In addition, the bending allows the sharp edges of the fiberglass joint shield to contact some of the cables connected to the cable connector, thereby resulting in an electrical failure.

Therefore, there is a need in the art for a joint shield with integrated mounting points. The integrated mounting points prevent the lifting straps from moving or becoming dislodged during the lifting and movement of the cable accessory.

There is also a need for a joint shield with raised sides and ends. The raises raised sides prevent a cable accessory from sliding off the front or back of the joint shield. Similarly, the raised ends prevent the cable accessory from sliding off the ends of the joint shield. In addition, the raised ends provide a support for at least a portion of some cables attached to the cable accessory.

Further, cable accessories, such as splices and disconnectable joints that are utilized in underground medium voltage applications, are typically covered in an arc proofing material. This material is arc and track resistant and is capable of withstanding exposure to plasma caused by an electrical failure without degrading as defined by industry standards. The arc proofing serves to protect the cable accessory from damage caused by other equipment failure, as well as containing a failure of the cable accessory itself. Currently, the connectors of the cable accessory are individually wrapped with arc proofing material, such as arc proofing tape or a molded boot made of arc proofing material.

A common problem with disconnectable joints is that the sleeve can become partially disassembled from the bus bar which can result in an electrical failure. In order to check for this condition, the arc proofing material must be removed for a splicer to visibly confirm that the sleeve is fully installed on the bus bar. Currently, this is accomplished by either cutting a window into the arc proofing tape or by removing the molded boot. Cutting the tape poses safety issues, because the splicer can inadvertently cut too deep and damage the sleeve or joint which could cause an electrical failure. Furthermore, removing the existing arc proof molded boot requires the use of substantial force, because the molded boot wraps underneath the connector of the cable accessory. The substantial force can cause excessive movement of the connectors of the cable connector, thereby resulting in an electrical failure.

Another apparent need in the art is for a removable arc proof cover that couples to the joint shield. The removable arc proof cover surrounds the cable accessory and is configured to allow a visual inspection of the cables connected to the cable accessory. The arc proof cover can also protect the cable accessory from external electrical failure, and contain the electrical failure of the cable accessory within it.

Further, there is a need in the art for a mounting point to secure an arc proof cover to the joint shield.

The art also does not exhibit a grasping point on the joint shield. The grasping point allows the splicer to grip the joint shield with their hand to assist with lifting and sliding the joint shield and its corresponding cable accessory.

There also exists a need in the art for a rigid support structure underneath the joint shield. The rigid support structure is configured to minimize the bending of the flexible joint shield.

SUMMARY

According to various embodiments of the present invention, a lifting support apparatus and system are disclosed with integrated mounting points. The lifting support apparatus comprises a joint shield and arc proof cover. A cable accessory is placed on the joint shield and surrounded on its sides and top by the arc proof cover. By incorporating mounting points on the joint shield, the lifting straps used to reposition the lifting support are prevented from sliding along the arc proof cover or becoming dislodged. Further, the sides and ends of the joint shield are raised. The raises raised sides prevent the cable accessory from sliding off the front or back of the joint shield. The raised ends support at least a portion of some cables attached to the cable accessory. In addition, the joint shield includes at least one rib support. The rib support is composed of a rigid material and configured to minimize the joint shield from bending.

BRIEF DESCRIPTION OF THE DRAWINGS

The detailed description makes reference to the accompanying figures wherein.

Other objects, features, and characteristics of the present invention, as well as methods of operation and functions of the related elements of the structure and the combination of parts, will become more apparent upon consideration of the following detailed description with reference to the accompanying drawings.

DETAILED DESCRIPTION OF THE PREFERRED EMBODIMENT

A detailed illustrative embodiment of the present invention is disclosed herein. However, techniques, methods, processes, systems, and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, electronic or otherwise, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words using the singular or plural number may also include the plural or singular number respectively. The word "or," in reference to a list of two or more items, covers all of the following interpretations of the word: any of the items in the list, all of the items in the list, and any combination of the items in the list. The following presents a detailed description of the preferred embodiment of the present invention with reference to the figures.

Figure 1:
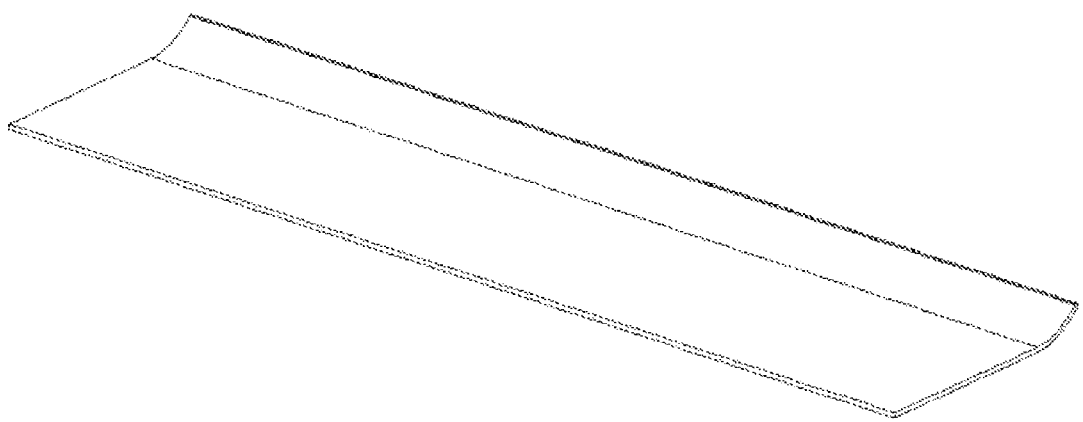
FIG. 1 illustrates a perspective view of a prior art joint shield.

Referring initially to FIG. 1, shown is a prior art joint shield adapted to transport a cable accessory, for example, a splice or disconnectable joint. The joint shield comprises a body and lip composed of flexible fiberglass material. Typically, a cable accessory (not shown) rests on top of the joint shield. The cable accessory is part of a power distribution system and may be energized or de-energized. As shown, the lip of the joint shield curves upward to prevent the cable accessory from sliding off the back of the joint shield. Further, the ends of the body of the joint shield are sharp edges. As a result, at least a portion of some power cables (not shown) attached to the cable accessory (not shown) can hang over the prior art joint shield. The connectors of the cable accessory are covered in an arc and track resistant material, for example arc proofing tape, or a molded boot made from arc proofing material. The arc proofing protects the cable accessory from damage caused by the electrical failure of other equipment in the power distribution system. In addition, the arc proofing contains the electrical failure of the cable accessory from damaging other equipment. Generally, the process of moving the cable accessory to another location of the power distribution system begins with wrapping straps (not shown) underneath the joint shield. Next, the straps, joint shield, and cable accessory are lifted and moved, either manually or with the assistance of a crane or winch.

A frequent problem not addressed by the prior art is that there is no location on the joint shield to properly secure lifting straps which are often used in the art to move an energized or de-energized cable accessory. As a result, the lifting straps can slip or become dislodged resulting in the joint shield and cable accessory sliding from the straps and falling. Further, the arc proofing wrapped around the connectors of the cable accessory prevents a splicer from easily identifying whether a connection of the cable accessory has become disconnected. Therefore, the splicer must cut a window in the arc proofing tape or remove the molded boot designed to protect the cable accessory. The process of cutting a window in the arc proofing tape can result in damage to the cable and/or connector underneath or injury to the splicer due to a partially energized cable accessory. Similarly, the process of removing the molded boot can cause excessive movement that can result in electrical failure of the cable accessory. In addition, the sharp edges of the joint shield permits at least a portion of the cables attached to the cable accessory to bend around a small radius or sharp point, thereby causing an electrical failure of the cable.

Figure 2:
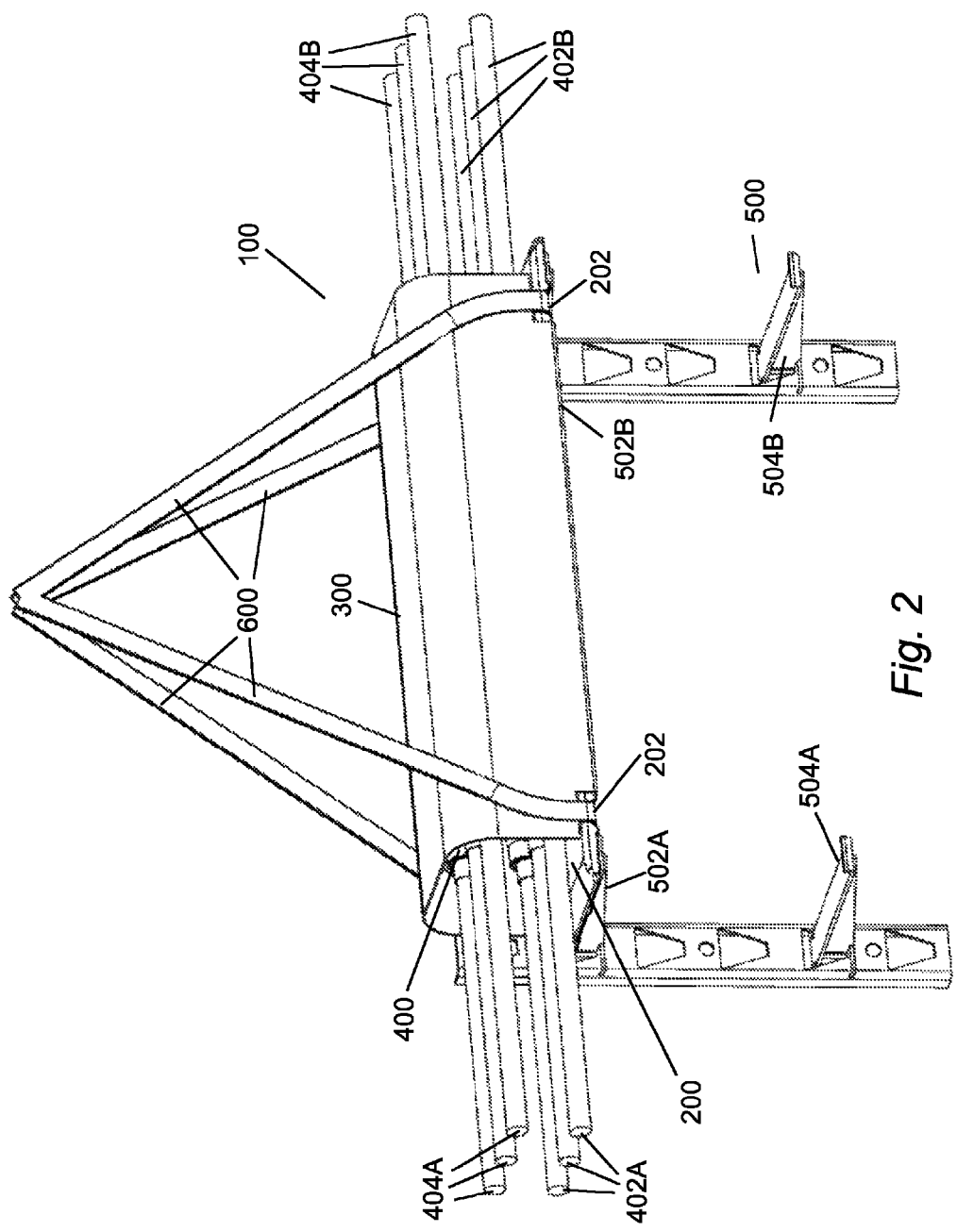
FIG. 2 illustrates a perspective view of a lifting support apparatus in accordance with the preferred embodiment of the present invention.

Referring now to FIG. 2, the preferred embodiment of the present invention provides lifting support 100 comprising joint shield 200 and arc proof cover 300. Lifting support 100 provides a series of contact support locations designed to allow securement of one or more lifting straps 600 to joint shield 200 and in certain environments to arc proof cover 300 for additional support. The present invention eliminates the need for arc proofing tape and a molded boot, common components known in the field of the invention, by providing an arc proofing cover. Arc proof cover 300 is configured to surround the cable accessory and allows the splicer to easily view the connectors of the cable accessory. In addition, arc proof cover 300 provides protection from electrical failure from other equipment in the power distribution system and contains the electrical failure of the cable accessory within it.

As shown in FIG. 2, cable accessory 400 is placed on top of joint shield 200. Power cables 402A, 404A, 402B, and 404B are coupled to cable accessory 400. Cable accessory 400 can be a disconnectable joint or other cable accessories known in the art. In turn, joint shield 200 is supported on left rack arm 502A and right rack arm 502B of cable rack 500. In the preferred embodiment of the present invention, joint shield 200 is composed of a flexible fiberglass, however, one of ordinary skill in the art will readily recognize that various materials of manufacture may be used including those currently known in the art. Joint shield 200 further includes at least one support rib (not shown) to provide a rigid structural support that minimizes bending when cable accessory 400 is placed on joint shield 200.

Arc proof cover 300 is preferably coupled to joint shield 200 and surrounds cable accessory 400. By surrounding cable accessory 400, arc proof cover 300 protects cable accessory 400 from an external electrical failure caused by equipment installed on a joint shield, either one currently used in the art or an embodiment of the present invention, supported on left rack arm 504A and right rack arm 504B.

As shown in FIG. 2, arc proof cover 300 includes an opening at each end and does not fully wrap the individual connectors of cable accessory 400. While such a configuration is preferred, configurations which further envelop and partially enclose cable accessory 400 around the vertical positions of arc proof cover 300 can be employed in certain environments. In the present invention, the individual connectors of cable accessory 400 are not wrapped with arc proofing tape. This design allows for a visual inspection of the individual connectors of cable accessory 400. Arc proof cover 300 can also be removed from joint shield 200 without requiring movement of the connectors of cable accessory 400.

Joint shield 200 further comprises at least one mounting point 202, and in this instance four mounting points (two shown) positioned near the corners of joint shield 200. In the preferred embodiment of the present invention, lifting strap 600 is configured to attach to mounting point 202. Thereafter, the assembly comprising joint shield 200, arc cover 300, and cable accessory 400 can be lifted, repositioned, and/or moved. By incorporating mounting points into the joint shield, the lifting straps are prevented from sliding along arc cover 300 or becoming dislodged during the lifting and movement process. Joint shield 200 includes raised sides and raised ends, which is described in further detail below with reference to FIG. 3A and FIG. 3B, to prevent movement of joint accessory 400 placed on joint shield 200. As shown in FIG. 2, the curved raised ends of joint shield 200 support at least a portion of some power cable 402A.

Figure 3A:
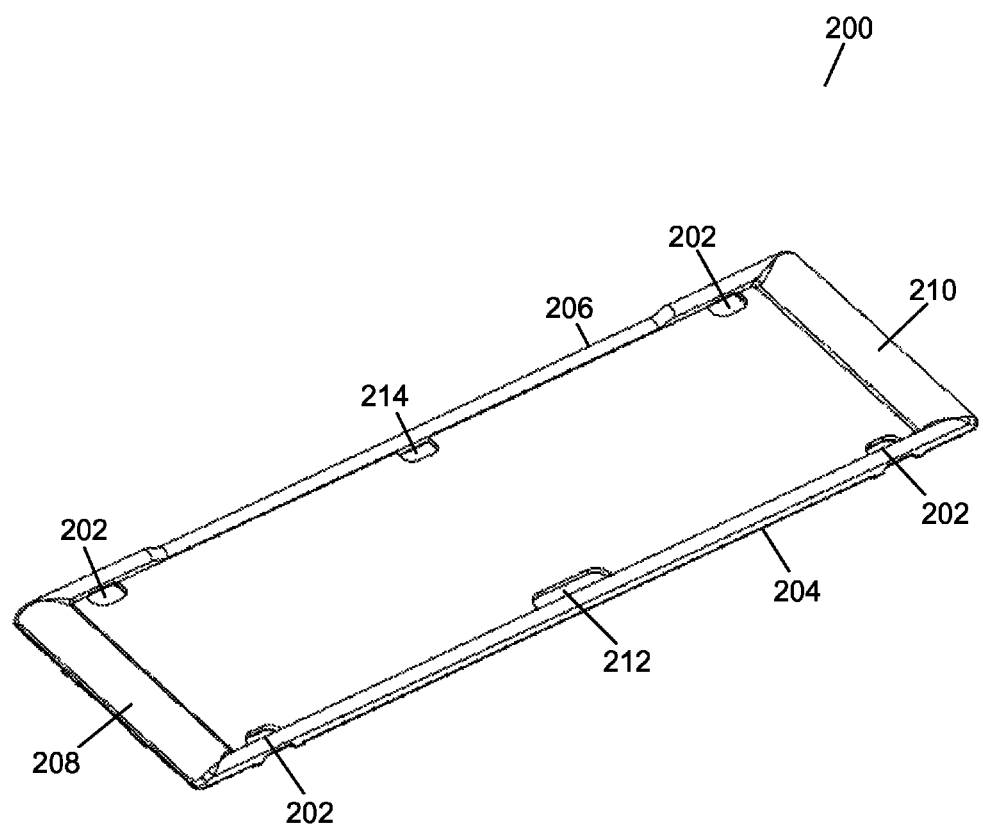
FIG. 3A is a perspective view of a joint shield in accordance with the preferred embodiment of the present invention.

FIG. 3A depicts a perspective view of joint shield 200 shown in FIG. 2. Joint shield 200 comprises front side 204, back side 206, first end 208, and second end 210. Front side 204 and back side 206 include a raised portion configured to prevent a cable accessory from sliding off the front and back side of joint shield 200. First end 208 and second end 210 preferably include a raised curved portion. The radius of the raised curved portion is configured to support the weight of at least a portion of some of the cables attached to the cable accessory. Joint shield 200 further includes at least one mounting point 202. As shown in FIG. 3A, mounting point 202 is preferably an opening in joint shield 200 adjacent to front side 204 or back side 206. A lifting strap (as shown in FIG. 1) is looped into mounting point 202. It would be readily apparent to one of ordinary skill in the art to use other mounting methods, such as a hook or snapping connectors, without departing from the spirit of the disclosed invention. In an alternative embodiment, the mounting point of the joint shield comprises guides positioned on the bottom surface of the joint shield and parallel to the ends of the joint shield. The guide can either extend the length of the ends of the joint shield or only a portion. In this embodiment, the lifting strap is positioned between the guides. Furthermore, the guides can include a lip to prevent the lifting strap from dislodging from the guides. In yet another embodiment, a locking mechanism is snapped or slide onto the guides after positioning the lifting strap. In some embodiments, the guides are provided by a groove in the joint shield, while in another the guides are the rib supports described in detail below with reference to FIG. 3C.

In the preferred embodiment of the present invention, joint shield 200 further includes grasping point 212 and cover mounting point 214. Grasping point 212 is located at a substantially intermediate position of front side 204. In the present invention, grasping point 212 is preferably an opening in joint shield 200 that is configured to provide a location for a splicer to grasp by hand and slide or lift joint shield 200 manually, but can also be configured for manipulation by other tools or even automatic devices. Cover mounting point 214 is located at a substantially intermediate position of back side 206. Cover mounting point 214 is preferably an opening in joint shield 200 that is configured to secure a strap. In the preferred embodiment, cover mounting point 214 is configured to attach to a strap that secures an arc proof cover to joint shield 200. However, it would be apparent to one of ordinary skill in the art that cover mounting point 214 can be configured to attach to a lifting strap or may be omitted, without departing from the spirit of the disclosed invention.

Figure 3B:
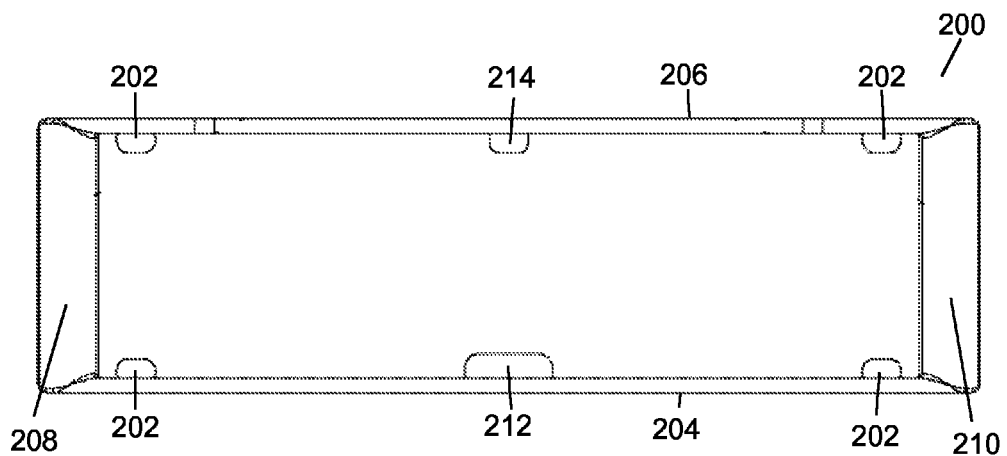
FIG. 3B is a top view of the joint shield shown in FIG. 3A in accordance with the preferred embodiment of the present invention.

FIG. 3B is a top view of the joint shield 200 depicted in FIG. 3A. The position of a cable accessory is secured on joint shield 200 by front side 204, back side 206, first end 208, and second end 210. Further, the openings of mounting point 202 and cover mounting point 214 are minimized to restrict the movement of straps attached to the respective mounting points. This design stabilizes joint shield 200 during the lifting and moving process. As shown in FIG. 3B, the opening of grasping point 212 is of sufficient size and dimension to provide access for a hand.

Figure 3C:
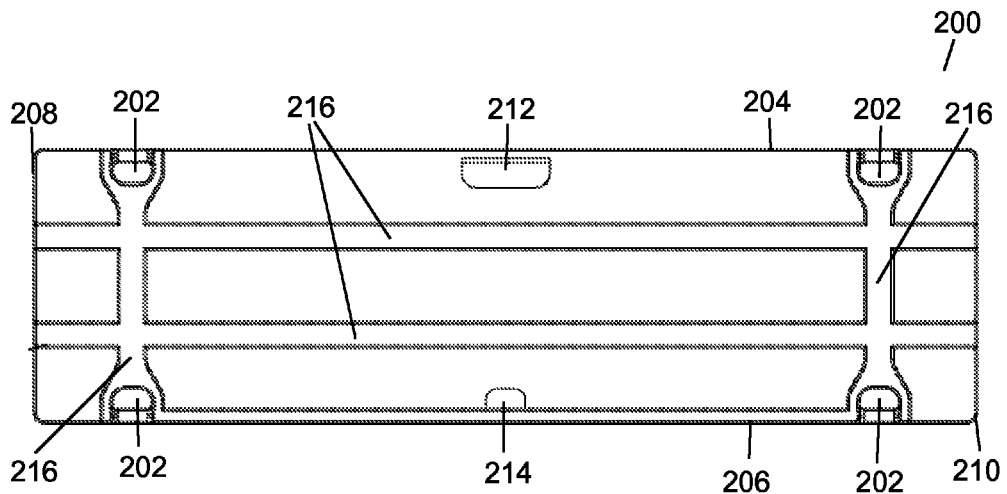
FIG. 3C is a bottom view of the joint shield shown in FIG. 3A in accordance with the preferred embodiment of the present invention.

Turning next to FIG. 3C, shown is a bottom view of the joint shield 200 depicted in FIG. 3A. Joint shield 200 includes at least one rib support 216 adapted to prevent joint shield 200 from bending. In the preferred embodiment, rib support 216 is composed of a rigid non-conducting material like fiberglass. Rib support 216 is positioned on the bottom of joint shield 200, such that the present invention can replace currently existing joint shields without the need for specialized tools or equipment. For example, the portion of rib support 216 that is supported by the rack arms can be tapered. Although the structure depicted for providing bend support to joint shield 200 comprises two rib supports 216 parallel to front side 204 and back side 206, and two rib supports 216 parallel to first end 208 and second end 210, it would also be apparent to one skilled in the art that other support structures can be used.

Figure 4:
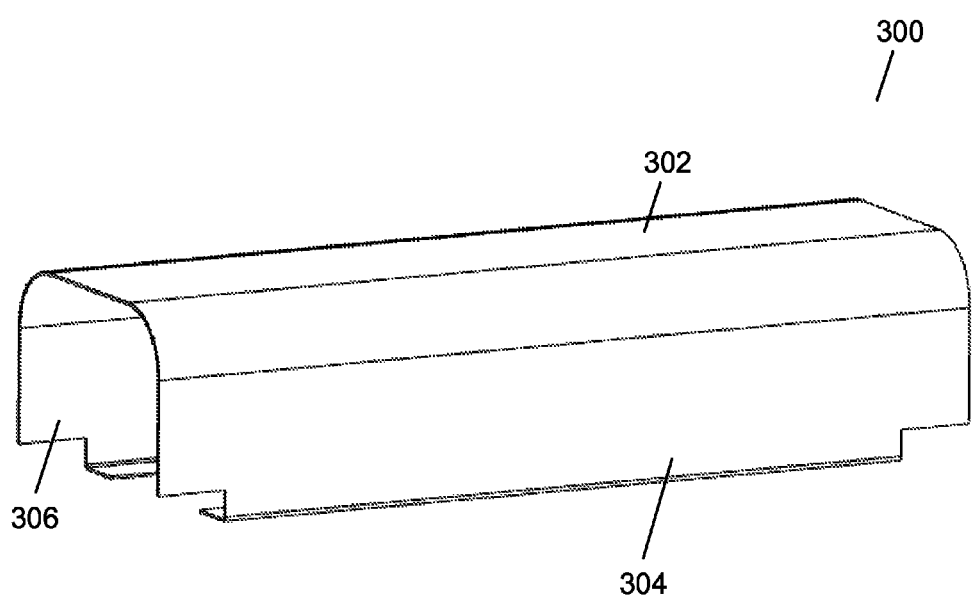
FIG. 4 is a perspective view of an arc proof cover in accordance with the preferred embodiment of the present invention.

FIG. 4 depicts a preferred embodiment of arc proof cover 300 shown in FIG. 2. Arc proof cover 300 comprises top 302, front side 304, and back side 306. Front side 304 of arc proof cover 300 is configured to attach to front side 204 of joint shield 200 shown in FIG. 3A. Back side 306 of arc proof cover 300 is configured to attach to back side 206 of joint shield 200 shown in FIG. 3A. Arc proof cover 300 can be made from various sizes and shapes to cover cable accessories of various shapes, sizes, and designs. In the preferred embodiment of the present invention, the height of top 302 of arc proof cover 300 is designed for the highest profile cable accessory. Therefore, in the field, the splicer can cut the arc proof cover to fit a cable accessory with a lower profile. Arc proof cover 300 is preferably composed of an arc proofing and track resistant material that is flexible. The arc proofing material is preferably a self-extinguishing polymer, comprising a blend of nitrile rubber and PVC, that is compounded with flame retardants. In the preferred embodiment, arc proof cover 300 is installed onto joint shield 200 by flexing front side 304 and back side 306 of arc proof cover 300 over front side 204 and back side 206 of joint shield 200, respectively. It would be apparent to one of ordinary skill in the art to attach arc proof cover 300 to joint shield 200 using various other means, such as a snapping means or sliding means, without departing from the spirit of the disclosed invention.

While the present invention has been described with reference to the preferred embodiment, which has been set forth in considerable detail for the purposes of making a complete disclosure of the invention, the preferred embodiment is merely exemplary and is not intended to be limiting or represent an exhaustive enumeration of all aspects of the invention. It will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A lifting support system comprising:
    a joint shield comprising:
        a first raised side comprising a first mounting point;
        a second raised side comprising a second mounting point;
        at least one curved end;
        a body; and
        a structural support;
    an arc resistant cover comprising:
        a top;
        at least one side; and
    wherein the arc resistant cover is attachable to the first mounting point and the second mounting point;
    at least one strap; and
    wherein the first mounting point is an opening in the body and adjacent to the first raised side.

2. A lifting support system comprising:
    a joint shield comprising:
        a first raised side comprising a first mounting point;
        a second raised side comprising a second mounting point;
        at least one curved end;
        a body; and
        a structural support;
    an arc resistant cover comprising:
        a top;
        at least one side; and
    wherein the arc resistant cover is attachable to the first mounting point and the second mounting point;
    at least one strap; and
    wherein the at least one strap is coupled to the first mounting point.

3. A lifting support system comprising:
    a joint shield;
    an arc resistant cover;
    at least one strap coupled to the joint shield; and
    an electrical cable connector;
    wherein the joint shield comprises a structural support;
    wherein the structural support comprises at least two parallel ribs; and
    wherein the at least one strap is coupled to the joint shield in areas coextensive with the at least two ribs.

* * * * *